United States Patent
Higuchi et al.

(10) Patent No.: US 10,003,968 B2
(45) Date of Patent: Jun. 19, 2018

(54) APPARATUS AND SYSTEM EFFECTIVELY USING A PLURALITY OF AUTHENTICATION SERVERS

(71) Applicant: ALAXALA Networks Corporation, Kanagawa (JP)

(72) Inventors: Hidemitsu Higuchi, Ebina (JP); Motohide Nomi, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 0 days. days.

(21) Appl. No.: 14/474,666

(22) Filed: Sep. 2, 2014

(65) Prior Publication Data

US 2014/0373112 A1    Dec. 18, 2014

Related U.S. Application Data

(63) Continuation of application No. 12/943,216, filed on Nov. 10, 2010, now abandoned.

(30) Foreign Application Priority Data

Nov. 13, 2009 (JP) .................. 2009-259428

(51) Int. Cl.
*H04W 12/06* (2009.01)
*H04L 29/06* (2006.01)

(52) U.S. Cl.
CPC ............. *H04W 12/06* (2013.01); *H04L 63/08* (2013.01); *H04L 63/205* (2013.01)

(58) Field of Classification Search
CPC . H04L 63/08; H04L 63/0892; H04L 63/0876; H04L 63/10; H04L 63/205; H04W 12/06
See application file for complete search history.

(56) References Cited

U.S. PATENT DOCUMENTS 7,143,435 B1 * 11/2006 Droms ................ H04L 29/1232 713/153
8,528,071 B1 * 9/2013 Kwan ................ H04L 63/0876 726/14

(Continued)

FOREIGN PATENT DOCUMENTS

JP        2007-280221        10/2007

OTHER PUBLICATIONS

Erwin, The IEEE 802.1x Port-Based Network Access Control and Its Implementation, 2002.*

(Continued)

*Primary Examiner* — Hadi S Armouche
*Assistant Examiner* — Huan V Doan
(74) *Attorney, Agent, or Firm* — Baker Botts L.L.P.

(57) ABSTRACT

A communication apparatus including: a plurality of physical ports to be coupled to different terminals via a network; a plurality of authentication processing units configured to execute an authentication process; and a controller configured to determine which one of the physical ports on which a packet was received from a terminal, to specify a preset authentication process corresponding to the determined physical port on which a packet was received, and to distribute the specified authentication process of the packet from the terminal to an authentication processing unit for executing.

13 Claims, 10 Drawing Sheets

(56) References Cited

U.S. PATENT DOCUMENTS

| | | | |
|---|---|---|---|
| 2003/0028808 A1* | 2/2003 | Kameda | H04L 63/08 |
| | | | 726/13 |
| 2005/0125692 A1 | 6/2005 | Cox et al. | |
| 2005/0289229 A1 | 12/2005 | Kim | |
| 2006/0007897 A1 | 1/2006 | Ishii | |
| 2006/0041939 A1* | 2/2006 | Schwartzman | H04L 63/0884 |
| | | | 726/15 |
| 2007/0038866 A1* | 2/2007 | Bardsley | H04L 63/0272 |
| | | | 713/182 |
| 2007/0044141 A1 | 2/2007 | Lor et al. | |
| 2007/0240204 A1 | 10/2007 | Somekawa et al. | |
| 2008/0056161 A1 | 3/2008 | Okita et al. | |
| 2008/0189769 A1* | 8/2008 | Casado | G06F 21/6281 |
| | | | 726/4 |
| 2008/0209071 A1 | 8/2008 | Kubota | |
| 2009/0034521 A1* | 2/2009 | Kato | G06F 21/31 |
| | | | 370/389 |
| 2009/0158392 A1 | 6/2009 | Hughes et al. | |
| 2009/0183252 A1* | 7/2009 | Nomi | H04L 63/08 |
| | | | 726/13 |
| 2010/0182984 A1 | 7/2010 | Herscovici et al. | |
| 2011/0004918 A1* | 1/2011 | Chow | H04L 63/20 |
| | | | 726/3 |

OTHER PUBLICATIONS

Erwin, The IEEE 802.1x Port-Based Network Access Control and Its Implementation, Oct. 2002, 15 pages.*

Chiornita et al., A Practical Analysis of EAP Authentication Methods, IEEE, 5 pages (Year: 2010).*

* cited by examiner

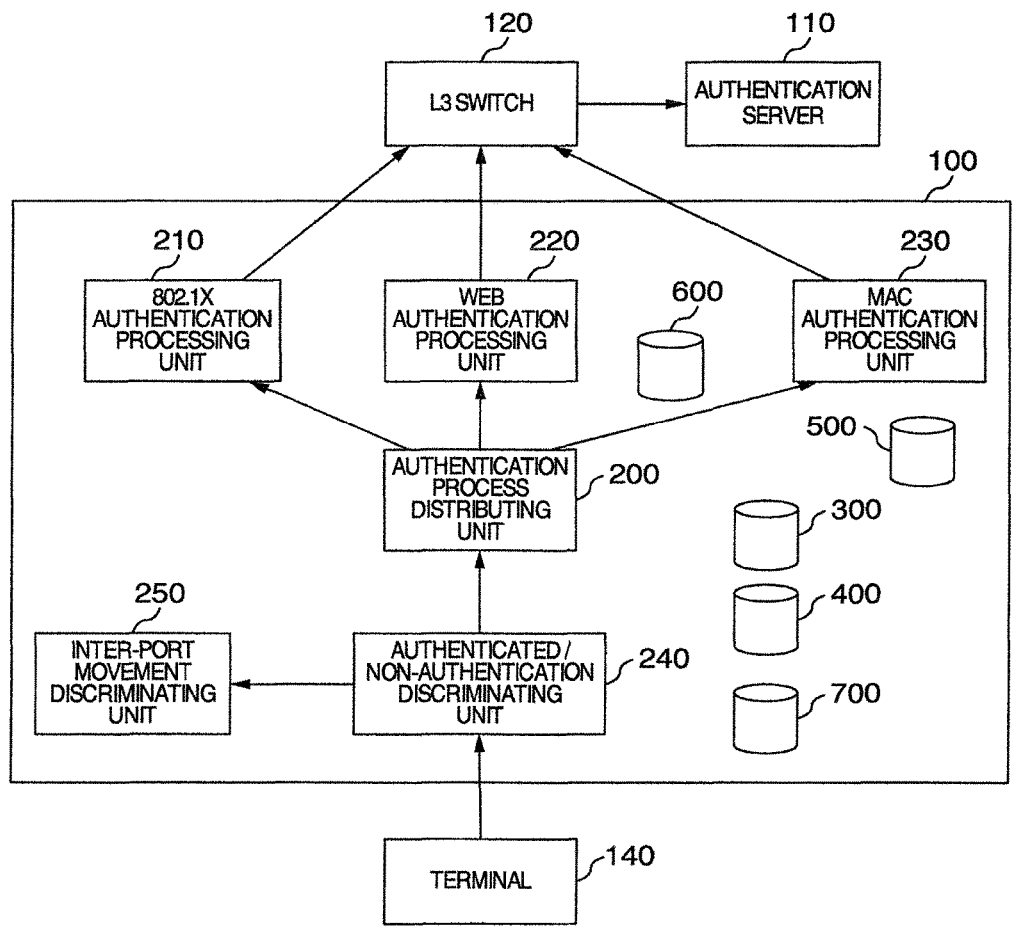

FIG.4

| AUTHENTICATING METHOD LIST NAME | AUTHENTICATING METHOD LIST | AUTHENTICATION SERVER GROUP LIST NO. |
|---|---|---|
| List-1 | Web | 1 |
| List-2 | MAC, Web | 2 |
| List-3 | MAC, 802.1X | 2 |

| LIST NO. | AUTHENTICATION SERVER INFORMATION |
|---|---|
| 1 | SERVER 1, SERVER 2 |
| 2 | SERVER 3, SERVER 4 |

| PORT NO. | WEB AUTHENTICATION DISPLAY SCREEN DATA INFORMATION |
|---|---|
| 1 | AUTHENTICATION DISPLAY SCREEN -1 |
| 2 | AUTHENTICATION DISPLAY SCREEN -2 |

| PORT NO. | AUTHENTICATED MAC ADDRESS |
|---|---|
| 1 | MAC-1, MAC-2 |
| 2 | MAC-3, MAC-4 |

700

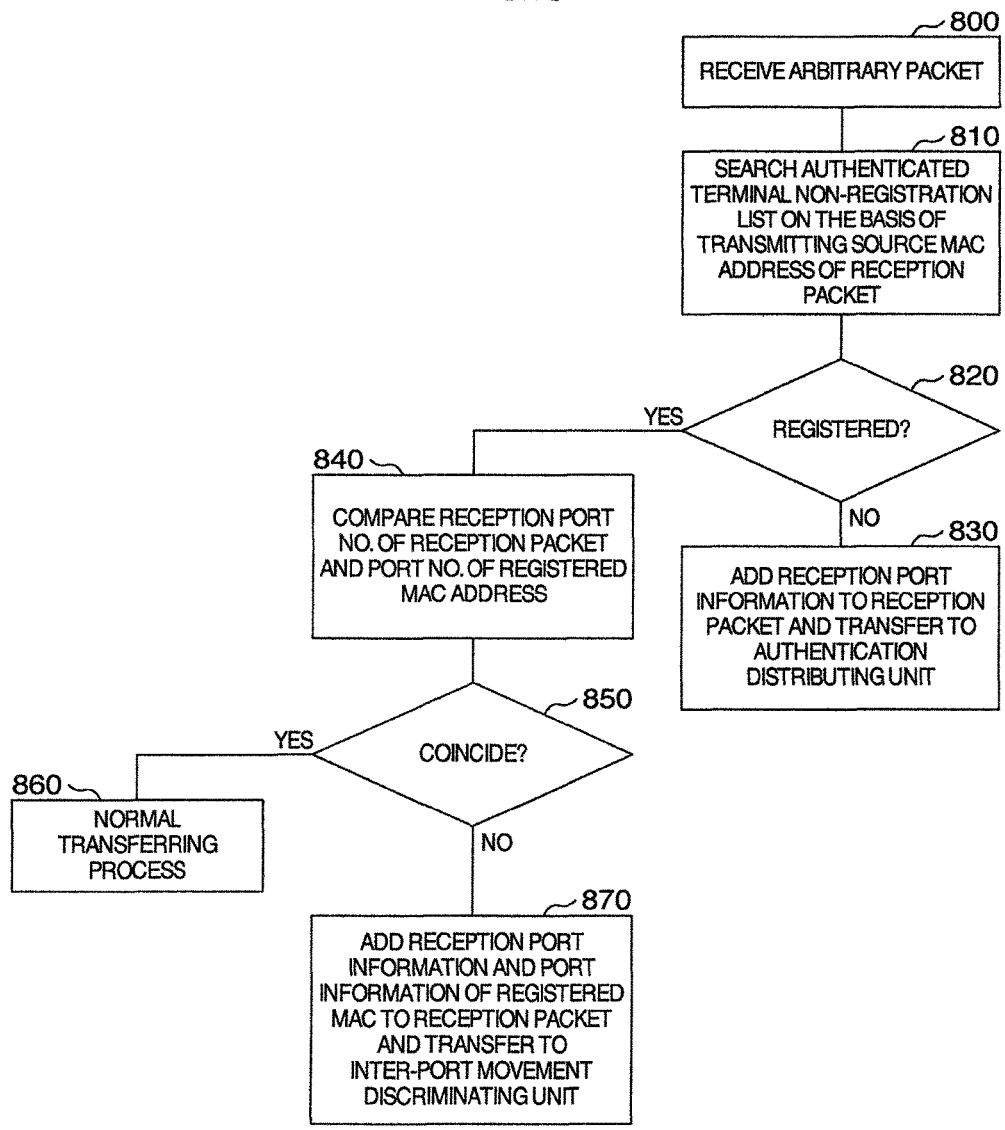

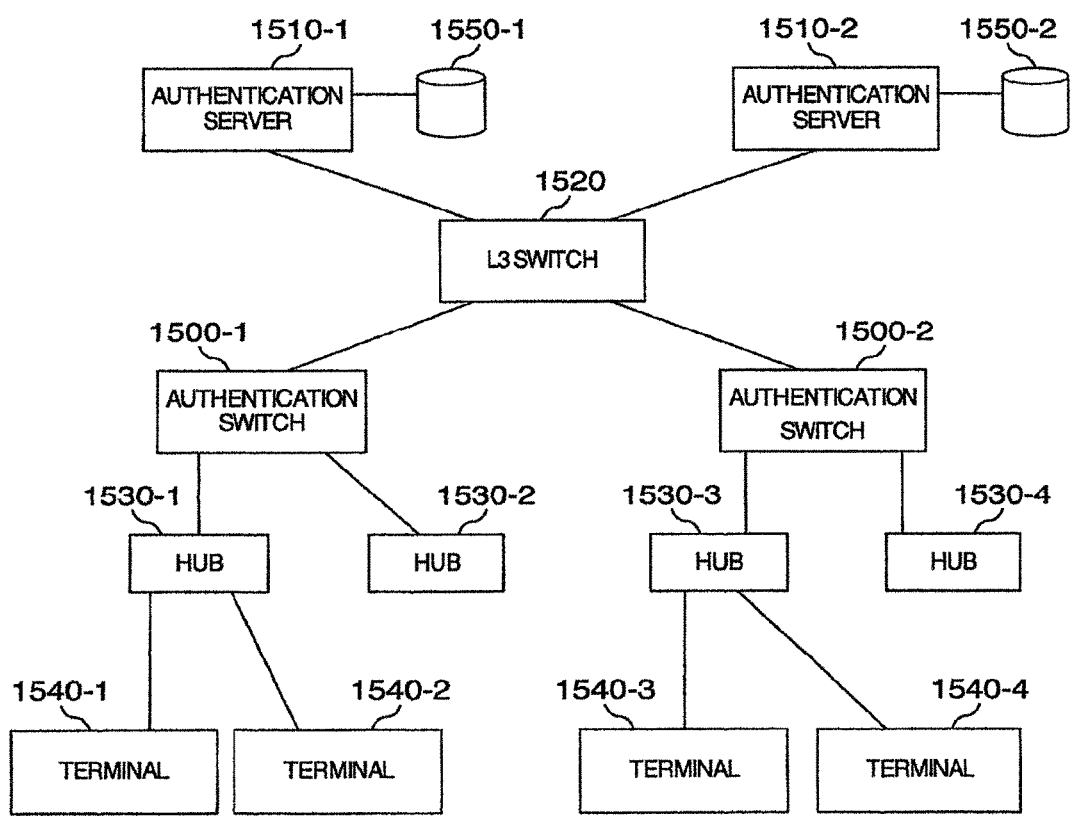

APPARATUS AND SYSTEM EFFECTIVELY USING A PLURALITY OF AUTHENTICATION SERVERS

CROSS REFERENCE TO RELATED APPLICATION

This is a continuation of U.S. application Ser. No. 12/943,216, filed Nov. 10, 2010. This application relates to and claims priority from Japanese Patent Application No. JP 2009-259428, filed on Nov. 13, 2009. The entirety of the contents and subject matter of all of the above is incorporated herein by reference.

BACKGROUND OF THE INVENTION

Field of the Invention

The invention relates to a network authentication system and, more particularly, to an apparatus and system using a plurality of authentication servers having different databases.

Description of the Related Art

In association with the infrastructure of a communication network, various kinds of functions to fortify security have been proposed. Network authentication is also one of those functions. A network authentication system is mainly comprised of terminal apparatuses such as PCs or the like, authentication switches, and authentication servers. As a fundamental operation of the authentication system, first, an authentication request packet is outputted from the terminal apparatus such as a PC to the authentication switch. When the authentication request packet is received, on the basis of authentication information in the reception packet, the authentication switch inquires of the authentication server whether or not the authentication information has been registered. When a fact that the authentication information has been registered is notified from the authentication server, the authentication switch enables a source MAC address of the authentication request packet to be communicated.

In the network authentication switch, hitherto, only one server could be designated as an authentication server to a target PC/user (there was a redundancy forming function of the authentication server as an existing function) and there was also a function for designating a RADIUS server on an authenticating method unit basis. For example, in the Official Gazette of JP-A-2007-280221, a plurality of authentication servers are constructed in order to authenticate one client PC.

SUMMARY OF THE INVENTION

In a network authentication environment constructed by a plurality of authentication servers and a plurality of authentication switches, hitherto, the authentication server has been designated on an authentication switch unit basis and operated and managed. At this time, if there is a movement of the user who is managed by the different authentication server, the network authentication management cannot be performed. For example, under such a situation that the authentication server has been disposed every floor and every division, it is necessary to handle a plurality of authentication servers by one authentication switch.

Hitherto, in the case where the enterprises which have been operated by each authentication server are united or the business divisions in the enterprise are united and employees exist mixedly in the workplace, the authentication servers cannot be operated by one authentication switch. It is, therefore, a subject to cope with a plurality of authentication servers by one authentication switch.

As another subject, in the case where a plurality of floors or a plurality of divisions are managed by one authentication switch and the Web authentication is used as an authenticating method, in order to use an authentication display screen as a message board, it is necessary to display the authentication display screen on a physical port unit basis.

Hitherto, as a method of designating a plurality of RADIUS servers and operating, a method whereby the redundant RADIUS servers are realized by allowing a plurality of RADIUS servers to have the same authentication data or a method whereby the different RADIUS server is designated in the case of using the MAC authentication and in the case of using the Web authentication existed.

However, since a quarantine server having a quarantine function for checking a security state of a PC is partially applied in addition to the authentication server, in the case where it is intended to separately operate and manage the authentication servers in one authentication switch on a PC unit basis, on a physical port unit basis, and the like, such a construction cannot be realized by the conventional authentication switch.

That is, in order to provide a variety of security services to a plurality of terminals or users by one authentication switch, it is necessary to connect a plurality of authentication servers. It is, therefore, an object of the invention to realize the following functions by one authentication switch: a function for designating a RADIUS server every physical port of the authentication switch; a function for displaying a different authentication display screen at each port in the case where an authenticating method is Web authentication and in the case where the RADIUS server is designated on a physical port unit basis; and a function whereby the authentication server can be designated when authentication information is inputted from a PC.

According to an aspect of the invention, there is provided a packet transfer apparatus or system comprising: a plurality of connecting ports; a plurality of authentication processing units for authenticating apparatuses connected through the connecting ports; and an authentication process distributing unit for selecting the authentication processing unit to be authenticated every connecting port, wherein any one of the plurality of authentication processing units is made to correspond to each of the plurality of connecting ports, and when a packet is received from the apparatus connected to one of the connecting ports, the authentication process distributing unit selects the authentication processing unit which was made to correspond to the connecting port to which the apparatus to which the packet was transmitted has been connected and allows an authenticating process of the packet-transmitted apparatus to be executed.

In the case where the enterprises which have different authentication servers and construct a network authentication system are united or the divisions in the enterprise are united and construct one network authentication system, the united network authentication system can be constructed without uniting authentication databases of the authentication servers.

Other objects, features and advantages of the invention will become apparent from the following descriptions of the embodiments of the invention taken in conjunction with the accompanying drawings.

BRIEF DESCRIPTION OF THE DRAWINGS

FIG. 2 is a functional block diagram of a network authenticating function in an authentication switch;

FIG. 3 is a port unit authenticating method list table;

FIG. 4 is an authenticating method list table;

FIG. 5 is an authentication server group list table;

FIG. 6 is a port unit Web authentication display screen data list table;

FIG. 7 is an authenticated terminal registration list;

FIG. 8 is a processing flow by an authenticated/non-authentication discriminating unit;

FIG. 16 is a network authentication system after enterprises were united.

DESCRIPTION OF THE EMBODIMENTS

[Embodiment 1]

It is a feature of the invention that even if there are a plurality of authentication servers due to an enterprise integration or an organization integration, an authenticating apparatus such as an authentication switch or the like can designate a plurality of authentication servers.

Ordinarily, when terminals are connected to an in-house network or the like, authentication is performed by a switch or the like having an authenticating function (hereinbelow, referred to as an authentication switch) and only the authenticated terminals can be connected to the in-house network. The authentication switch performs the authentication by inquiring of the authentication server having authentication information of the terminal. The authentication server of which the authentication switch inquires is fixed.

A case where enterprises A and B having authentication systems of different methods have been united by amalgamation is now considered. Since a case where the employees of the companies A and B work on the same floor of the same building is also considered, it is necessary that the authentication switch allocated to the floor authenticates terminals of the employees of both of the companies. That is, it is necessary to selectively use the authentication servers and, further, the authenticating methods of both of the companies A and B. To solve the above problem, the authentication switch of the invention has a function for distributing the authentication servers or authenticating methods in accordance with necessity.

Problems in the enterprise integration or the like in the network authentication system in the related art and a construction of the invention will be sequentially described hereinbelow.

Figure 15:
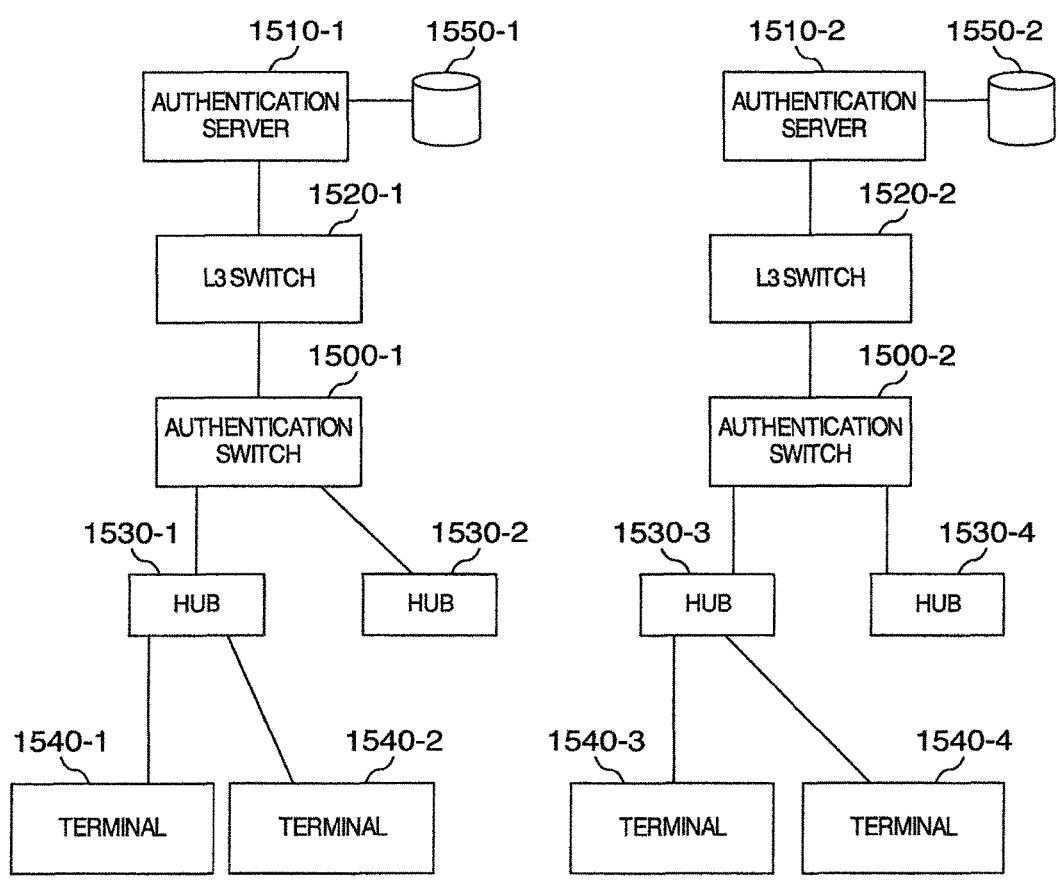
FIG. 15 is a network authentication system before enterprises are united.

A network authentication system before enterprises or organizations are united is shown in FIG. 15. The authentication system shown in FIG. 15 has a construction using the conventional authentication switch. In this system, registration information in an authentication database 1550-1 registered in an authentication server 1510-1 and registration information in an authentication database 1550-2 registered in an authentication server 1510-2 differ.

The authentication server 1510-1 has been registered in an authentication switch 1500-1. The authentication server 1510-2 has been registered in an authentication switch 1500-2. In the authentication databases 1550-1 and 1550-2 held by the authentication servers, authentication information of their organizations have been registered and they are not identical. A flow of simple network authentication will be described. As network authentication systems, there are MAC authentication, Web authentication, and 802.1X authentication.

First, a flow of the authentication using the MAC authenticating method will be described. First, a terminal 1540-1 is connected to a port of a HUB 1530-1. When an arbitrary packet is transmitted from the terminal 1540-1 to the authentication switch 1500-1, the authentication switch 1500-1 inquires of the authentication server 1510-1 about the authentication by using a transmitting source MAC address of the reception packet.

At this time, although a plurality of authentication servers can be registered into the authentication switch 1500-1 in order to realize redundancy, the switch can have only one kind of authentication database. The authentication server which is accessed first from one authentication switch has been fixed and only one authentication server is accessed. In the case where the relevant MAC address has been registered in the authentication database 1550-1, the authentication server 1510-1 issues a notification indicative of authentication OK to the authentication switch 1500-1. In the authentication switch 1500-1, an authentication permitting process is executed to the relevant MAC address and the terminal 1540-1 can communicate.

A flow of the authentication using the Web authenticating method will be described. The user of the terminal connects the terminal 1540-1 to the HUB 1530-1 and makes an authenticating request by http/https to the authentication switch 1500-1. The authentication switch 1500-1 sends authentication information registration display screen data to the terminal 1540-1. The user inputs the authentication information by the registration display screen and transmits to the authentication switch 1500-1. When the authentication information is received, the authentication switch 1500-1 makes the authenticating request to the authentication server 1510-1 on the basis of the authentication information. Although a plurality of authentication servers can be registered into the authentication switch 1500-1 in order to realize redundancy, the switch can have only one kind of authentication database.

The authentication server which is accessed first from one authentication switch has been fixed and only one authentication server is accessed. In the case where the relevant authentication information has been registered in the authentication database 1550-1, the authentication server 1510-1 issues a notification indicative of authentication OK to the authentication switch 1500-1. In the authentication switch 1500-1, an authentication permitting process is executed to the MAC address of the relevant terminal and the terminal 1540-1 can communicate. Authentication is also performed in the 802.1X authenticating method by a similar authenticating sequence. A similar network authenticating process is also executed in the authentication system using the authentication switch 1500-2.

A constructional diagram of a network authentication system in the case where enterprises or organizations were united by using the conventional authentication switch is shown in FIG. 16. In the conventional authentication switch, only the authentication server having one kind of authentication database can be registered by one switch. Therefore, in the case where enterprises or organizations are united and the number of authentication servers increases, the conventional authentication switches as many as the increased number of authentication servers are necessary.

A flow of the network authentication will be simply described. In the case of using the Web authentication as a network authentication system, the user of the terminal 1540-1 connects the terminal 1540-1 to the HUB 1530-1 and makes an authenticating request by http/https to the authentication switch 1500-1. The authentication switch 1500-1 sends authentication information registration display screen data to the terminal 1540-1. The user inputs the authentication information from the registration display screen and transmits to the authentication switch 1500-1.

When the authentication information is received, the authentication switch 1500-1 makes the authenticating request to the authentication server 1510-1 on the basis of the authentication information. The authenticating request is not performed to the authentication server 1510-2. Similarly, in the case where a terminal 1540-3 which is connected to a HUB 1530-3 which is connected to the authentication switch 1500-2 performs authentication, the authentication switch 1500-2 makes the authenticating request only to the authentication server 1510-2 and does not makes the authenticating request only to the authentication server 1510-1.

As mentioned above, in the case where the conventional switches were used, since it is necessary to change over the authentication switches by the user to be authenticated, if a network authentication system is comprised of enterprise integration, organization integration, or the like, operation and construction costs increase.

Figure 1:
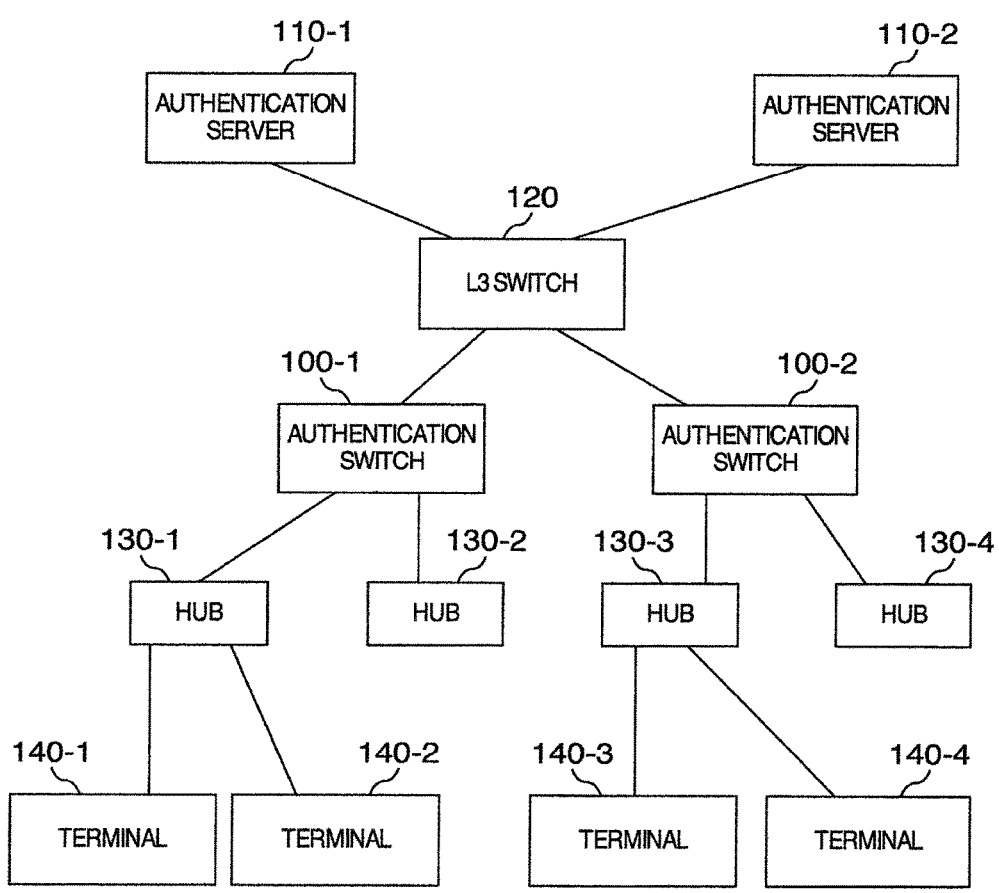
FIG. 1 is a constructional diagram of a network authentication system.

An embodiment of the invention will be described hereinbelow with reference to FIGS. 1 to 14. A construction of a network authentication system will now be described with reference to FIG. 1. FIG. 1 is a hardware block diagram of the authentication system. In FIG. 1, the network authentication system is comprised of: an L3 switch 120; two authentication servers 110 and two authentication switches 100 connected to the L3 switch 120; HUBs 130 connected to the authentication switches 100; and terminals 140 connected to the HUBs 130.

A construction of processing units for realizing the network authenticating function of the authentication switch 100 is shown in FIG. 2. Each of the processing units and databases which are used will now be described. An authenticated/non-authentication discriminating unit 240 has functions for receiving a packet from the terminal and discriminating whether a transmitting source MAC address of the reception packet has already been authenticated or is not authenticated yet. An inter-port movement discriminating unit 250 checks a state before the authenticated terminal is moved and a state after it was moved, thereby discriminating whether or not roaming of the authentication state can be performed.

An authentication distributing unit 200 discriminates the authentication processing units to be distributed on the basis of the reception packet and reception port information which were received, and transmits the reception packet and reception port information to the authentication processing units. Each of the authentication processing units (a 802.1X authentication processing unit 210, a Web authentication processing unit 220, a MAC authentication processing unit 230) searches for the relevant authentication server from an authentication server group list table on the basis of the reception port information and executes an authenticating process to the relevant authentication server.

Tables which are used in the authentication switch 100 are shown in FIGS. 3 to 7. A port unit authenticating method list table 300 is a correspondence table of a port number of the authentication switch and an authenticating method list name. A constructional example is shown in FIG. 3.

An authenticating method list table 400 is a correspondence list of an authenticating method list and an authentication group server having an authenticating method list name, an authenticating method list, and an authentication server group list number as component elements. A constructional example is shown in FIG. 4.

An authentication server group list table 500 is a list table having a list number and authentication server information as component elements. As authentication server information, an IP address, MAC address information, and the like of the authentication server are registered. A constructional example is shown in FIG. 5.

A port unit Web authentication display screen data list table 600 is a table having a port number of the authentication switch and Web authentication display screen data information as elements. As Web authentication display screen data information, position information (directory information and the like) of the Web authentication display screen data) stored in the authentication switch is stored. A constructional example is shown in FIG. 6.

An authenticated terminal registration list 700 is a correspondence table of the port number of the authentication switch and an authenticated MAC address. In a constructional example shown in FIG. 7, a state where MAC addresses MAC-1 and MAC-2 have been registered in the port No. 1 of the authentication switch is shown.

By referring to the port unit authenticating method list table 300, authenticating method list table 400, and authentication server group list table 500, the information of the registered authentication server can be obtained for each of ports of the authentication switches. An explanation will be made with reference to FIGS. 3 to 5.

An authenticating method list name List-1 registered in the port No. 1 of the authentication switch is obtained from the port unit authenticating method list table 300 shown in FIG. 3. The relevant authentication server group list No. 1 is extracted from the authenticating method list table 400 shown in FIG. 4 by using List-1. Finally, by extracting the relevant authentication server information "server 1, server 2" from the authentication server group list table 500 shown in FIG. 5, the authentication server information corresponding to the port No. 1 of the authentication switch can be obtained.

Separately from the tables shown in FIGS. 3 to 5, a table having the port number information of the authentication switch and the authentication server information as component elements can be also used.

Subsequently, a processing flow of each processing unit in the authentication switch 100 will be described with reference to FIGS. 8 to 14. First, a flow of processes of the authenticated/non-authentication discriminating unit 240 will be described with reference to FIG. 8. When an arbitrary packet is received (800) from the terminal 140, the authenticated/non-authentication discriminating unit 240 searches the authenticated terminal registration list 700 on the basis of the transmitting source MAC address of the reception packet.

If the relevant MAC address is not registered in the table, the MAC address which is not authenticated yet is discriminated, the reception port information is added to the reception packet, and the resultant packet is transferred to the authentication distributing unit 200 (830). If the relevant MAC address has been registered in the table, the reception port number in the authentication switch of the reception packet and the port number of the registered MAC address are compared (840). If they coincide, the reception packet is determined as a packet from the authenticated terminal and an ordinary packet transferring process is executed (860). If they do not coincide, it is determined that the terminal having the authenticated MAC address has been moved, the reception port information and the port information of the registered MAC are added to the reception packet, and the resultant packet is transferred to the inter-port movement discriminating unit (870).

Figure 14:
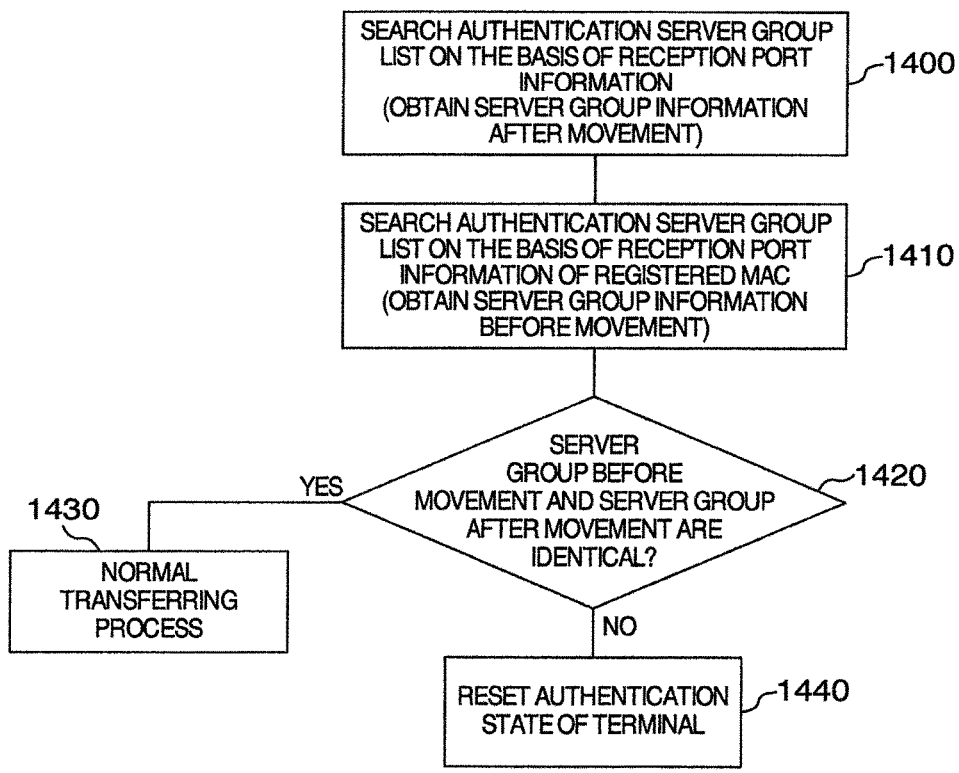
FIG. 14 is a processing flow of an inter-port movement discriminating unit.

Subsequently, a flow of processes of the inter-port movement discriminating unit 250 will be described with reference to FIG. 14. When the reception packet, the reception port information of the reception packet, and the port information of the registered MAC are received from the authenticated/non-authentication discriminating unit 240, the inter-port movement discriminating unit 250 searches the authentication server group list table 500 on the basis of the reception port information and obtains the server group information after the terminal was moved (1400). The unit 250 searches the authentication server group list table 500 on the basis of the reception port information of the registered MAC and obtains the server group information before the terminal is moved (1410). Subsequently, the server group before the movement and the server group after the movement are compared (1420). If they do not coincide, the authentication state of the relevant terminal is reset (1440). If they coincide, the ordinary transferring process is executed.

By comparing the server group information before the movement of the terminal and that after the movement as mentioned above, such a situation that the authenticated terminal is moved between the ports at which the different authentication servers have been registered can be inhibited, and authentication security can be assured.

The inter-port movement discriminating unit in the related art has such a function that when a connection destination of the authenticated terminal is changed (moved) from the port in the connected authentication switch to another port, VLAN-ID before the movement and VLAN-ID after the movement are compared, if they differ, the authentication is cancelled, and if they are identical, the authentication state is continued (roaming).

A network in which in order to allocate the same VLAN-ID to a plurality of ports and uniform traffics, the users are limited on a port unit basis will be described here. To construct such a network, the operation to set the authentication servers on a port unit basis according to the invention is necessary.

Subsequently, a case of applying the inter-port movement discriminating unit to the present network will be described. If the inter-port movement discriminating unit in the related art is used, in the case where VLAN-ID of the destination to which the authenticated terminal has moved when it moves between the ports is the same as VLAN-ID before the movement, the roaming is permitted. Therefore, the traffics cannot be controlled every port. On the other hand, according to the inter-port movement discriminating unit of the invention, since the type of authentication server before the movement of the terminal and that after the movement are compared, the roaming discrimination which is made in the inter-port movement discriminating unit in the related art is not performed. That is, if the type of authentication server set in the port before the movement of the terminal and that after the movement are different, after the terminal was moved, the apparatus enters the authentication cancelling state and the traffics can be separated.

Figure 9:
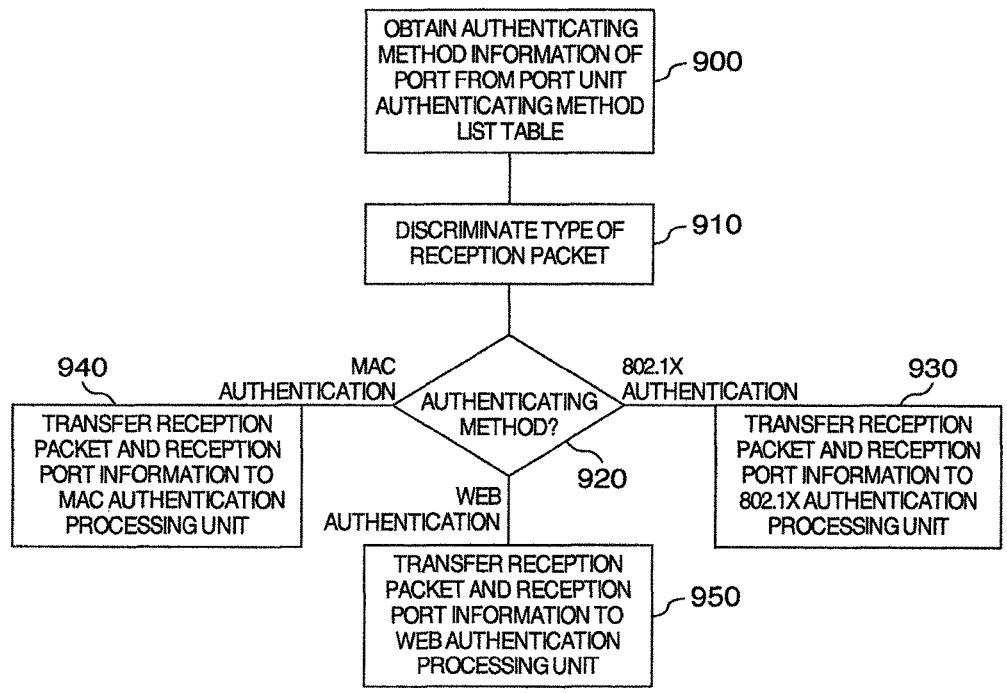
FIG. 9 is a processing flow of an authentication process distributing unit.

Subsequently, a flow of processes of the authentication distributing unit 200 will be described with reference to FIG. 9. When the reception packet and the reception port information are received from the authenticated/non-authentication discriminating unit 240, the authentication distributing unit 200 obtains the authenticating method information of the relevant port from the port unit authenticating method list table 300 (900) and discriminates whether the network authenticating process is executed by using which authenticating method on the basis of the type of reception packet (910). If it is determined that the authenticating method is the MAC authentication, the reception packet and the reception port information are transferred to the MAC authentication processing unit (940). If it is determined that the authenticating method is the web authentication, the reception packet and the reception port information are transferred to the Web authentication processing unit (950). If it is determined that the authenticating method is the 802.1X authentication, the reception packet and the reception port information are transferred to the 802.1X authentication processing unit (930).

Figure 11:
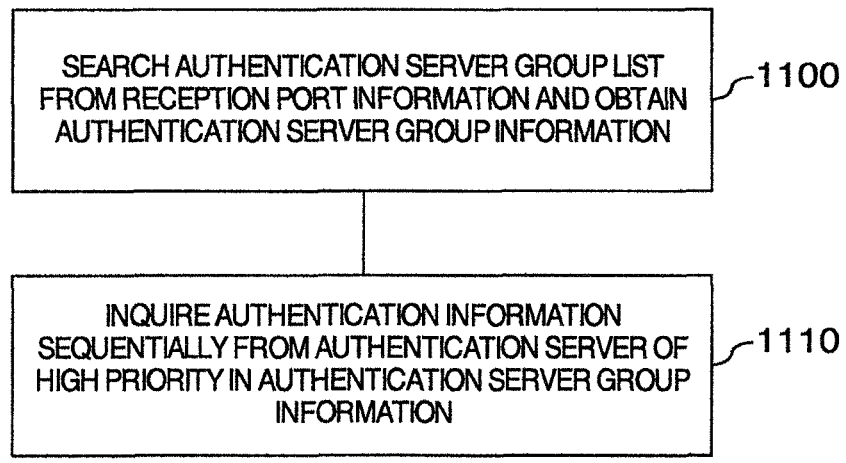
FIG. 11 is a processing flow of a MAC authentication processing unit.

Subsequently, a flow of processes of the MAC authentication processing unit 230 will be described with reference to FIG. 11. When the reception packet and the reception port information are received from the authentication distributing unit 200, the MAC authentication processing unit 230 obtains the authentication server group information from the reception port information by using the port unit authenticating method list table 300, authenticating method list table 400, and authentication server group list table 500 (1100). The authentication information is inquired sequentially from the authentication server of the high priority in the authentication server group information (1110). In this manner, the authentication server is selected on an authentication port unit basis and the network authentication can be made.

Figure 12:
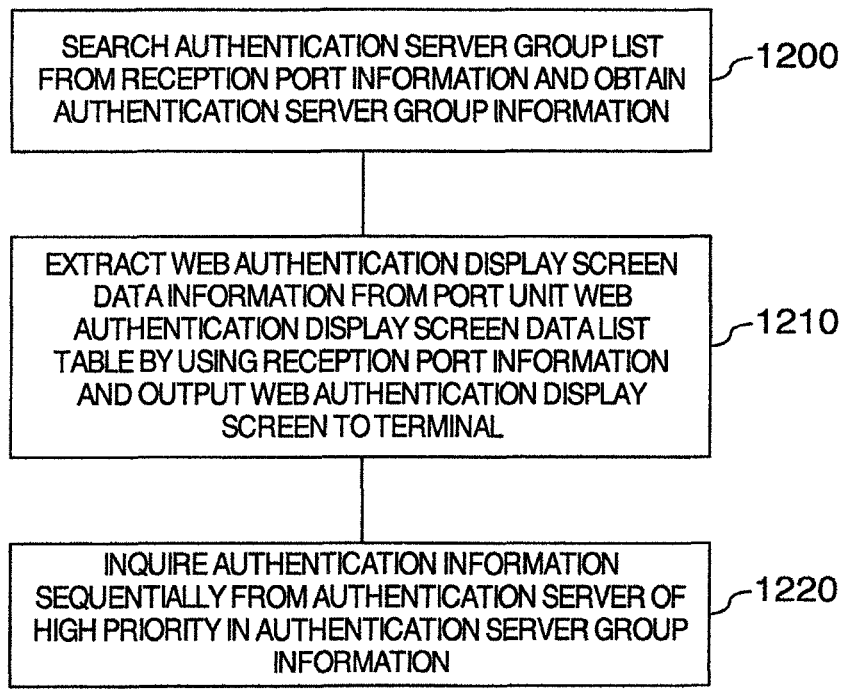
FIG. 12 is a processing flow of a Web authentication processing unit.

Subsequently, a flow of processes of the Web authentication processing unit 220 will be described with reference to FIG. 12. When the reception packet and the reception port information are received from the authentication distributing unit 200, the Web authentication processing unit 220 obtains the authentication server group information from the reception port information by using the port unit authenticating method list table 300, authenticating method list table 400, and authentication server group list table 500 (1200). The unit 220 extracts the Web authentication display screen data information from the port unit Web authentication display screen data list table 600 by using the reception port information and outputs the Web authentication display screen to the terminal (1210). When the authentication information is received from the terminal, the authentication information is inquired sequentially from the authentication server of the high priority in the authentication server group information which has previously been obtained (1220). In this manner, by outputting the Web authentication display screen on an authentication port unit basis and selecting the authentication server, the network authentication can be made.

Figure 10:
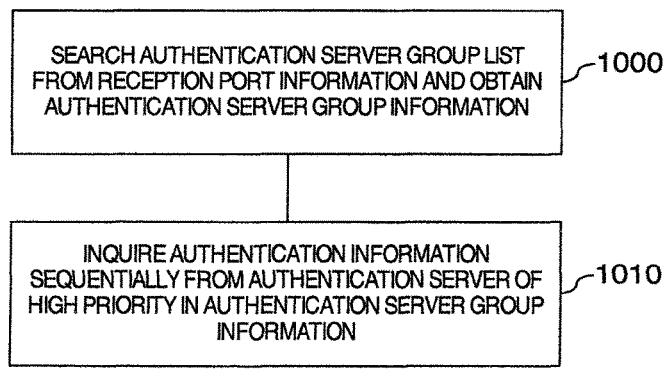
FIG. 10 is a processing flow of a 802.1X authentication processing unit.

Subsequently, a flow of processes of the 802.1X authentication processing unit 210 will be described with reference to FIG. 10. When the reception packet and the reception port information are received from the authentication distributing unit 200, the 802.1X authentication processing unit 210 obtains the authentication server group information from the reception port information by using the port unit authenticating method list table 300, authenticating method list table 400, and authentication server group list table 500 (1000). The authentication information is inquired sequentially from the authentication server of the high priority in the authentication server group information (1010). In this manner, the authentication server is selected on an authentication port unit basis and the network authentication can be made.

Subsequently, a case where a plurality of authenticating methods have been combined will be described. When an arbitrary packet is received from the terminal 140 connected to the port of the port No. 2 the authenticated/non-authentication discriminating unit discriminates whether the transmitting source MAC address of the reception packet has already been authenticated or is not authenticated yet. In the present description, it is assumed that the transmitting source MAC address is not authenticated yet.

Subsequently, since it is necessary to authenticate the transmitting source MAC address which is not authenticated yet, on the basis of the received reception packet and the reception port information, the authentication distributing unit 200 discriminates the authentication processing unit which is distributed, and transfers the reception packet and the reception port information to the authentication processing unit. Specifically speaking, the authentication distributing unit 200 obtains an authenticating method list name List-2 corresponding to the port No. 2 with reference to the port unit authenticating method list table 300.

Subsequently, the authenticating methods MAC and Web corresponding to List-2 are obtained with reference to the authenticating method list table 400. Subsequently, the authentication distributing unit 200 transfers the reception packet and the reception port information to the MAC authentication processing unit 230 and the Web authentication processing unit 220 corresponding to the obtained authenticating methods. The MAC authentication processing unit 230 and the Web authentication processing unit 220 obtain the corresponding authentication server information "server 3, server 4" from the port unit authenticating method list table 300, authenticating method list table 400, and authentication server group list table 500.

In the case where a plurality of servers are included in the authentication server information, their priorities have been predetermined The servers having the second and subsequent priorities are used as spare authentication servers. In the present description, it is assumed that the smaller the number of the server is, the higher the priority is. Therefore, the MAC authentication processing unit 230 and the Web authentication processing unit 220 issue the authenticating request to "server 3". If there is no response, they issue the authenticating request to "server 4". This is true of the case where there is only one authenticating method.

Subsequently, an embodiment of an authentication server selecting method by the user ID in the case where the Web authentication has been selected as network authentication will be described.

Figure 13:
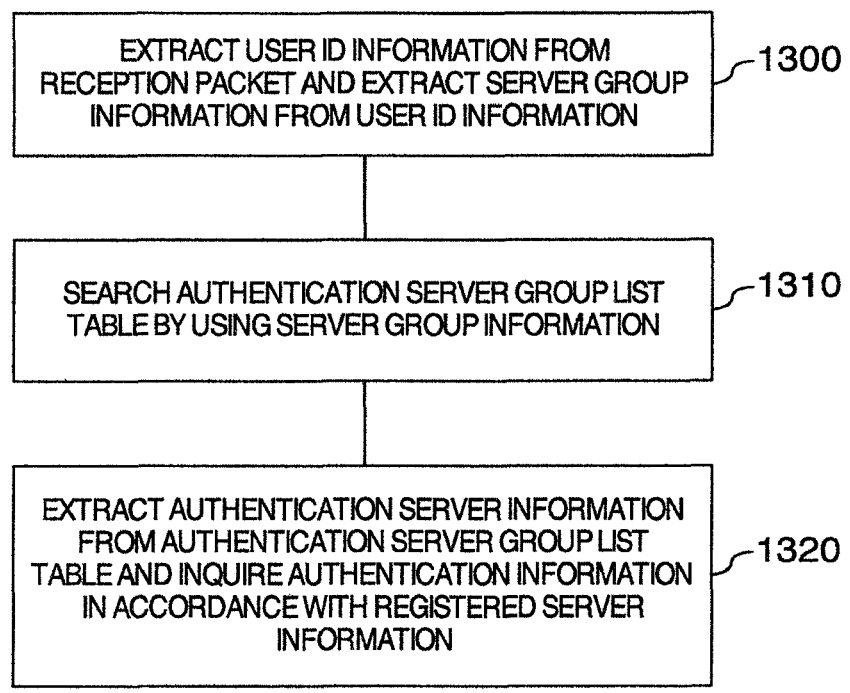
FIG. 13 is a processing flow for selecting an authentication server on a user ID unit basis of the Web authentication processing unit.

A flow of processes for selecting the authentication server on a user ID unit basis in the Web authentication processing unit 220 will be described with reference to FIG. 13. When the reception packet is received from the authentication distributing unit 200, the Web authentication processing unit 220 extracts the user ID information from the reception packet. Then, the unit 220 extracts server group information from the user ID information (1300). The server group information included in the user ID information indicates, for example, information partitioned by a special character such as "@" or the like.

Assuming that there is user ID information of "user A@server 1", it shows the authentication information at the time when "user A" makes the network authentication and "server 1" partitioned by "@" becomes the server group information.

Subsequently, the authentication server group list table 500 is searched on the basis of the server group information and the relevant authentication server information is extracted (1310).

The authentication information is inquired sequentially from the authentication server of the high priority registered in the relevant authentication server information (1320). In this manner, the authentication server is selected on a user ID unit basis and the network authentication can be made.

In the case of newly introducing the authentication server having the quarantine function into the network authentication system, the authentication server having the quarantine function can be introduced step by step while leaving the conventional authentication servers. The authentication system having the partial quarantine function can be introduced into the authentication network using only the conventional authentication servers.

In the network authentication system using the Web authentication, in the case where additional information such as a division or the like of the connection destination has been displayed on an authentication information input display screen which is outputted to the terminal apparatus and the system is operated, according to the invention, the authentication system can be constructed for a plurality of divisions by one authentication switch.

In the case where the enterprises which have the different authentication servers and construct the network authentication system are united or the divisions in the enterprise are united and one network authentication system is constructed as mentioned above by introducing the present invention, the united network authentication system can be constructed without combining the authentication databases of the authentication servers.

In the case where the quarantine system associated with the network authentication and the Web authentication is allowed to exist mixedly, since the Web authentication display screen can be changed on a port unit basis, the erroneous input of the user can be prevented by changing the Web authentication display screen which is used only for the network authentication and the Web authentication display screen associated with the quarantine.

In the case where the Web authentication system is operated by using a plurality of authentication servers by the organization integration or the like, such an operation that identification information of each authentication server is displayed onto the Web authentication display screen which is displayed to the terminal apparatus can be realized. Therefore, to which authentication server (organization) the non-authenticated person belongs can be known.

In the case where the authentication system is constructed by using one authentication switch to a plurality of floors where a plurality of organizations exist, the authentication servers on the respective floors differ. In the invention, since such a situation that the authenticated terminal is moved between the ports at which the different authentication servers have been registered can be inhibited, the authentication security between the floors can be assured.

By setting one authentication server to an apparatus such as a printer or the like which is used at a fixed port and by setting the authentication servers for the users at other ports, even if the PC is connected to the port to which the printer is connected and it is intended to allow the user authentication to be made, since the authentication server differs, it cannot be connected. Consequently, the authentication security is improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication apparatus comprising:
    a processor;
    a plurality of physical ports to be coupled to different terminals via a network;
    a first table for associating each of the physical ports with a MAC address information of an authenticated terminal;
    a second table for associating the physical port with an authentication method list and an authentication server group list indicating the authentication method for which the authentication server is adapted, wherein the authenticating method for authenticating the method list includes a Media Access Control authentication, a 802.1X authentication, and a web authentication; and
    a memory storing instructions that, when executed by the processor, cause the communication apparatus to:
        execute a process of different authentication methods, wherein each of the different authentication methods corresponds to one of the plurality of physical ports;
        determine, upon receiving a packet from a terminal which is not registered in the first table, which one of the authentication methods to apply to the received packet and a physical port information indicating the physical port that received the packet, according to the physical port information, a type of the received packet, and the second table;
        select the authentication server according to the second table and execute an authentication process to the selected authentication server; and
        upon receiving a packet from a terminal which is registered in the first table, when the physical port information indicating the physical port that received the packet and the physical port associated with the MAC address in the first table do not coincide, search the authentication server group list based on the physical port information indicating the physical port that received the packet to determine a first server group, search the authentication server group list based on the physical port associated with the MAC address in the first table to determine a second server group, and determine whether the first server group and the second server group are identical, wherein if the first server group and the second server group do not coincide, the terminal is determined to be not authenticated and if the first server group and the second server group do coincide, the terminal is determined to be authenticated;
    wherein when the specified authentication process is a web authentication, the communication apparatus is further configured to:
        receive an authentication request based on hypertext transfer protocol or hypertext transfer protocol secure from a terminal, extract a first information and a second information from the authentication information in the authentication request;
        select, using the second information, an authentication server from among the plurality of authentication servers for a web authentication; and,
        send the first information to the selected authentication server for the web authentication using the second information.

2. The communication apparatus according to claim 1, wherein the plurality of physical ports includes a first physical port and a second physical port;
    wherein the communication apparatus is further configured to execute a first authentication process, and a second authentication process;
    wherein the first table and the second table indicate that the first physical port on which a packet is to be received is associated with a first authenticating method list, and the second physical port on which a packet is to be received is associated with a second authenticating method list; and
    wherein, in response to receiving a packet from a terminal, the communication apparatus is further configured to determine either one of the first or second physical ports on which a packet was received from a terminal, to select an authentication process from among the first or second authenticating method list corresponding to the determined physical port on which a packet was received, and to distribute the selected authentication process of the packet to at least either one of the first or second processing method list for executing the selected authentication process.

3. The communication apparatus according to claim 1, wherein the specified authentication process includes an inquiry process to inquire to an authentication server about whether a packet from a terminal is authenticated or not.

4. The communication apparatus according to claim 1, wherein:
    the plurality of physical ports includes a first physical port, a second physical port and a third physical port;
    wherein the communication apparatus is further configured to, when a packet from a terminal is received on the first physical port or the second physical port or the third physical port, determine which one of the authentication methods respectively adapted for the received packet and the physical port information indicating the physical port which received the packet should be applied according to the packet received physical port information, a type of the received packet, and the second table.

5. The communication apparatus according to claim 1, wherein the preset authentication process is specified based on the determined physical port without relation to a port number which bounds to a particular authentication protocol.

6. The communication apparatus according to claim 1, wherein:
    a port number is used for identifying a physical port among the physical ports within the communication apparatus itself; and
    wherein the communication apparatus is further configured to determine either one of the physical ports on which a packet was received with the port number.

7. The communication apparatus according to claim 1, wherein:
    a port number is assigned to each one of the physical ports for identifying a physical port among the physical ports within the communication apparatus itself; and wherein the communication apparatus is further configured to determine, with the port number, either one of the physical ports on which a packet was received.

8. The communication apparatus according to claim 1, wherein:
a port number is assigned to each physical port without any relation to specifying an authentication protocol of a packet from a terminal.

9. The communication apparatus according to claim 1, wherein the authentication information includes the first information, the second information, and a predetermined character for partition between the first information and the second information.

10. The communication apparatus according to claim 9, wherein:
the authentication information is user information which is input via a terminal; and
the first information is a user ID and the second information specifies a server to be assigned for a web authentication.

11. The communication apparatus according to claim 10, further comprising:
a web authentication display screen data information table which is configured to store web authentication display screen data information for associating with each of the physical ports; and
wherein the communication apparatus is further configured to send, to a terminal, the web authentication display screen data information for inputting a user information when receiving a packet from a terminal based on the physical port of the packet received.

12. The communication apparatus according to claim 1, wherein:
when the specified authentication process is a web authentication:
in response to receiving a packet form a terminal, the communication apparatus is further configured to select a web authentication display screen data information for inputting a user information among plurality of image data related to a web authentication based on a physical port on which the packet was received from a terminal, send the selected web authentication display screen data information to a terminal;
receive an authentication request related to hypertext transfer protocol or hypertext transfer protocol secure including the user information; and
execute the web authentication based on the user information.

13. The communication apparatus according to claim 12, wherein:
the communication apparatus is further configured to extract a first information and a second information from the user information in the authentication request inputted by a terminal;
select, using the second information, an authentication server from among the plurality of authentication servers for a web authentication;
and send the first information to the selected authentication server, for the web authentication using the first information.

* * * * *